(12) United States Patent
Ueno et al.

(10) Patent No.: US 9,098,838 B2
(45) Date of Patent: Aug. 4, 2015

(54) PORTABLE TERMINAL DEVICE AND METHOD OF DETERMINING COMMUNICATION PERMISSION THEREOF

(75) Inventors: Yasuhiro Ueno, Kanawa (JP); Manabu Sakuma, Kanawa (JP)

(73) Assignee: KYOCERA Corporation, Kyoto (JP)

( * ) Notice: Subject to any disclaimer, the term of this patent is extended or adjusted under 35 U.S.C. 154(b) by 528 days.

(21) Appl. No.: 12/865,215

(22) PCT Filed: Jan. 30, 2009

(86) PCT No.: PCT/JP2009/051662
§ 371 (c)(1),
(2), (4) Date: Jul. 29, 2010

(87) PCT Pub. No.: WO2009/096566
PCT Pub. Date: Aug. 6, 2009

(65) Prior Publication Data
US 2010/0332392 A1    Dec. 30, 2010

(30) Foreign Application Priority Data
Jan. 30, 2008    (JP) ................................. 2008-019975

(51) Int. Cl.
*G06Q 40/00* (2012.01)
*G06Q 20/06* (2012.01)
(Continued)

(52) U.S. Cl.
CPC ............ *G06Q 20/0658* (2013.01); *G06Q 20/14* (2013.01); *G06Q 20/32* (2013.01); *G06Q 20/3221* (2013.01); *G06Q 20/3227* (2013.01); *G06Q 20/40* (2013.01); *G06Q 20/405* (2013.01)

(58) Field of Classification Search
CPC .......... H04L 63/0861; H04L 63/0853; G06Q 20/40145; G06Q 20/4016; G06Q 40/00

USPC ........................................................... 705/35
See application file for complete search history.

(56) References Cited

U.S. PATENT DOCUMENTS 6,738,750 B2 *    5/2004    Stone et al. ...................... 705/5
6,972,660 B1 *    12/2005   Montgomery et al. ...... 340/5.52
(Continued)

FOREIGN PATENT DOCUMENTS

JP    2002-82914    3/2002
JP    2002-207948   7/2002
(Continued)

OTHER PUBLICATIONS
International Search Report from PCT/JP2009/051662 dated Mar. 3, 2009.
(Continued)

*Primary Examiner* — Scott S Trotter
(74) *Attorney, Agent, or Firm* — Procopio, Cory, Hargreaves & Savitch LLP (57) ABSTRACT

A portable terminal device includes a wireless communication unit (103) which receives charging information (payment permission request information), a sub-storage unit (100) which stores electronic money information increased and decreased by the charging information (payment permission request information), and a sub-control unit (102) which performs charging processing based on the charging information (payment permission request information) received by the wireless communication unit (103). The sub-control unit specifies the upper limit of a payable amount or a charging category based on an authentication rate acquired by biometric authentication, determines whether the charging is within the upper limit of a payable amount or whether the charging is in a payable charging category based on the charging information (payment permission request information) acquired by the wireless communication unit, and provides external notification that the charging is not possible when not within the upper limit of the payable amount or when not matching the payable charging category.

10 Claims, 8 Drawing Sheets

CONDITION STORAGE TABLE

| AUTHENTICATION RATE | LIMITED AMOUNT OF MONEY |
|---|---|
| 20% | 2000 YEN |
| 30% | 4000 YEN |
| 40% | 8000 YEN |
| 50% | 10000 YEN |
| 60% | 12000 YEN |
| 70% | 18000 YEN |
| 80% | 24000 YEN |
| 90% | 40000 YEN |
| 100% | 50000 YEN |

~--120

(51) Int. Cl.
*G06Q 20/14* (2012.01)
*G06Q 20/32* (2012.01)
*G06Q 20/40* (2012.01)

(56) References Cited

U.S. PATENT DOCUMENTS

| | | | |
|---|---|---|---|
| 7,578,438 B2* | 8/2009 | Hogg et al. | 235/380 |
| 7,715,593 B1* | 5/2010 | Adams et al. | 382/115 |
| 7,814,332 B2* | 10/2010 | Beenau et al. | 713/186 |
| 7,992,792 B2* | 8/2011 | Van Rensburg | 235/492 |
| 2006/0210126 A1* | 9/2006 | Cho | 382/124 |
| 2007/0185718 A1* | 8/2007 | Di Mambro et al. | 704/273 |

FOREIGN PATENT DOCUMENTS

| | | |
|---|---|---|
| JP | 2007-48118 | 2/2007 |
| JP | 2007-265200 | 10/2007 |

OTHER PUBLICATIONS

Final Rejection dated Oct. 9, 2012, issued in counterpart Japanese Application No. 2009-551627.

* cited by examiner

CONDITION STORAGE TABLE

| AUTHENTICATION RATE | LIMITED AMOUNT OF MONEY |
|---|---|
| 20% | 2000 YEN |
| 30% | 4000 YEN |
| 40% | 8000 YEN |
| 50% | 10000 YEN |
| 60% | 12000 YEN |
| 70% | 18000 YEN |
| 80% | 24000 YEN |
| 90% | 40000 YEN |
| 100% | 50000 YEN |

| AUTHENTI-CATION RATE | 20% | | | |
|---|---|---|---|---|
| LIMITED AMOUNT OF MONEY | 2000 | | | |
| AUTHENTI-CATION RATE | 40% | | | |
| LIMITED AMOUNT OF MONEY | 8000 | | | |
| AUTHENTI-CATION RATE | 60% | | | |
| LIMITED AMOUNT OF MONEY | 12000 | ...... | | |

(b)

AUTHENTI-CATION RATE  20%

LIMITED AMOUNT OF MONEY  2000 YEN (c)

! OVER LIMITED AMOUNT OF MONEY

PAYMENT AMOUNT  5000 YEN

LIMITED AMOUNT OF MONEY  2000 YEN

*FIG. 7*

| CONDITION STORAGE TABLE | |
|---|---|
| AUTHENTICATION RATE | LIMIT CATEGORY |
| 40% | TRANSPORTATION FACILITIES |
| 80% | TRANSPORTATION FACILITIES + PRODUCT PURCHASES |

120'

PORTABLE TERMINAL DEVICE AND METHOD OF DETERMINING COMMUNICATION PERMISSION THEREOF

TECHNICAL FIELD

The present invention relates to a portable terminal device and a method of determining communication permission thereof, which are capable of processing electronic money via an RFID (Radio Frequency Identification) communication.

BACKGROUND ART

An RFID refers to an IC chip or a resin card including a nonvolatile memory and a wireless communication (RFID communication) function by electromagnetic waves, therein. Recently, an IC chip or card including a high security function or a CPU in an RFID tag has appeared.

It is possible to exchange data for fee payment by using the RFID as a pre-paid card or electronic money and holding the RFID over a reading terminal.

Recently, an attempt to use a mobile phone instead of a ticket or a wallet has been made with an RFID tag built in a mobile phone.

Here, the "electronic money" refers to a monetary value represented in digital data and is used as a payment means for shopping without use of a credit card or cash, or for an electronic commercial transaction using the Internet or the like.

In mobile phones which handle electronic money, a number of techniques for security improvement have been proposed.

For example, there have been known mobile phones which permit the payment of electronic money only when fingerprint authentication has succeeded by providing a fingerprint authentication device (for example, see JP-A-2002-82914)

DISCLOSURE OF THE INVENTION

Problem to be Solved by the Invention

According to the technique disclosed in JP-A-2002-82914, it is possible to obtain an authentication result for a valid user and perform centralized management of access rights for a product purchase or use of a pay service by the fingerprint authentication technique applicable to a mobile phone.

However, a lot of time is necessary and a probability of an authentication failure is high depending on a preset authentication establishment condition when employing a payment condition using a fingerprint authentication or face authentication technique. Thus, convenience might be sacrificed in consideration of a use scene or the like at the time of passing through a station ticket gate.

The present invention is to provide a portable terminal device and a method of determining communication permission thereof which are capable of maintaining high security without sacrificing convenience as possible.

Means for Solving the Problem

A portable terminal device according to an embodiment of the present invention, includes: a biometric authentication unit which executes an authentication process based on biometric information; a request acquisition unit which acquires permission request information; and a control unit which controls a predetermined function according to the permission request information acquired by the request acquisition unit, wherein the control unit specifies a permissible range according to an authentication rate calculated based on the authentication process by the biometric authentication unit, and allows the predetermined function to be executed when a permission request based on the permission request information acquired by the request acquisition unit is within the specified permissible range.

The above portable terminal device may further include a communication unit which communicates with an external communication device as one of the request acquisition unit. The predetermined function may be a function related to the communication unit, and the control unit may determine whether the permission request based on the permission request information received by the communication unit is within the specified permissible range, and causes the communication unit to transmit a result of the determination.

Further, when the permission request based on the permission request information acquired by the request acquisition unit is out of the specified permissible range, the control unit may request a re-input of biometric information to the biometric authentication unit without allowing the predetermined function to be executed.

The above portable terminal device may further include a condition storage unit which associates and stores the permissible range with the authentication rate, and the control unit may specify the permissible range based on the association of the authentication rate with the permissible range stored in the condition storage unit.

Further, the control unit may include a main control unit which calculates the authentication rate, and a sub-control unit which determines whether the permission request based on the permission request information received by the communication unit is within the specified permissible range.

When authentication process is executed by the biometric authentication unit, the main control unit may determine whether the authentication rate based on the authentication process reaches a minimum authentication value, and the main control unit may control the sub-control unit to be activated when the authentication rate reaches the minimum authentication value, and may control the sub-control unit to be not activated when the authentication rate does not reach the minimum authentication value.

The portable terminal device may further include a charging storage unit which is controlled by the sub-control unit and stores electronic money information, and the permission request information may be charging request information regarding the electronic money information.

Further, an upper limit of a permitted amount of money of charging for the electronic money information may be set as the permissible range in the condition storage unit.

Further, as the authentication rate is higher, the upper limit of the permitted amount of money of charging may be set to be larger in the condition storage unit.

Further, information indicating a charging category may be included in the charging request information, and a charging category in which charging is permitted may be associated and set as the permissible range in the condition storage unit.

The above portable terminal device may further include a display unit. At the time of determining whether the permission request information received by the communication unit is within the permissible range specified according to the authentication rate, when determining that the permission request information is out of the permissible range, the sub-control unit may notify the main control unit, and the main control unit causes the display unit to display payment disapproval when it is notified from the sub-control unit that the information is out of the permissible range.

The communication unit may perform magnetic field communication using an electromagnetic wave.

The above portable terminal device may further include an operation unit which receives an input as one of the request acquisition unit, and a condition storage unit which divides an authentication rate into a plurality of levels and associates and stores a function which is permitted to be excused for each of the levels. The predetermined function may be a function which is requested to be executed by the operation unit, the control unit may compare the authentication rate calculated based on the authentication process by the biometric authentication unit with the condition storage unit, and specify a function which is permitted to be executed by the authentication rate as the permissible range, and the control unit may determine whether a predetermined function which is requested to be executed based on the permission request information input by the operation unit is within the specified permissible range, and allow the predetermined function to be executed when the predetermined function is within the specified permissible range.

The above portable terminal device may further include a communication unit which communicates with an external communication device as one of the request acquisition unit, and a condition storage unit which divides an authentication rate into a plurality of levels and associates and stores an access type with which an access to an external device is permissible via the communication unit for each of the levels. The predetermined function may be an access to be executed by the communication unit to the external device, the control unit may compare an authentication rate calculated based on the authentication process by the biometric authentication unit with the condition storage unit, and specify an access type which is permissible by the authentication rate as the permissible range, and the control unit may determine whether an access which is requested to be executed based on the permission request information acquired by the communication unit is within the specified permissible range, and allow the access to be executed when the access is within the specified permissible range.

A method of determining communication permission according to another embodiment of the present invention is a method determining communication permission for a portable terminal device having a biometric authentication unit, the method including: acquiring permission request information; executing an authentication process by the biometric authentication unit and calculating an authentication rate thereof; specifying a permissible range according to the authentication rate; determining whether the acquired permission request information is within the permissible range; and outputting a result of determining whether the acquired permission request information is within the permissible range.

Effect of the Invention

The portable terminal device and the method of determining communication permission thereof according to the present invention, it is possible to maintain high security without sacrificing convenience as possible.

EXPLANATION OF REFERENCE

1: Mobile phone
10: RFID unit
11: Main control unit (Authentication processing unit)
12: Storage unit
13: Operation unit
14: Display unit
15: Public communication unit
16: Biometric information extraction unit
100: Sub-storage unit
101: Interface unit
102: Sub-control unit (Charging processing unit)
103: Wireless communication unit
120: Condition storage table (Condition storage unit)

BEST MODE FOR CARRYING OUT THE INVENTION

Figure 1:
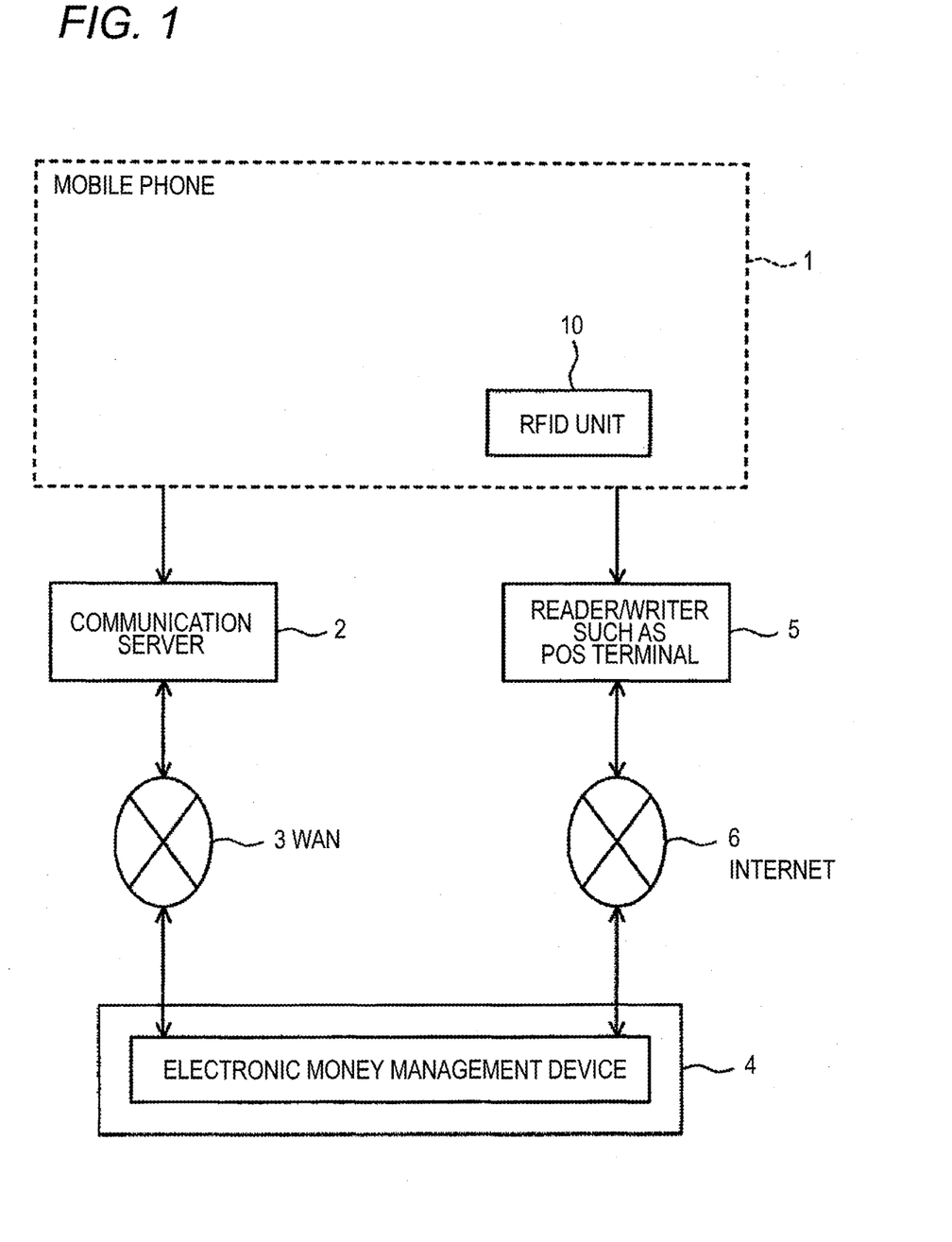
FIG. 1 is a diagram showing an example of the configuration of an electronic money management system to which a portable terminal device is connected according to an embodiment of the present invention.

FIG. 1 is a diagram showing an example of the configuration of an electronic money management system to which a portable terminal device is connected according to an embodiment of the present invention.

Figure 2:
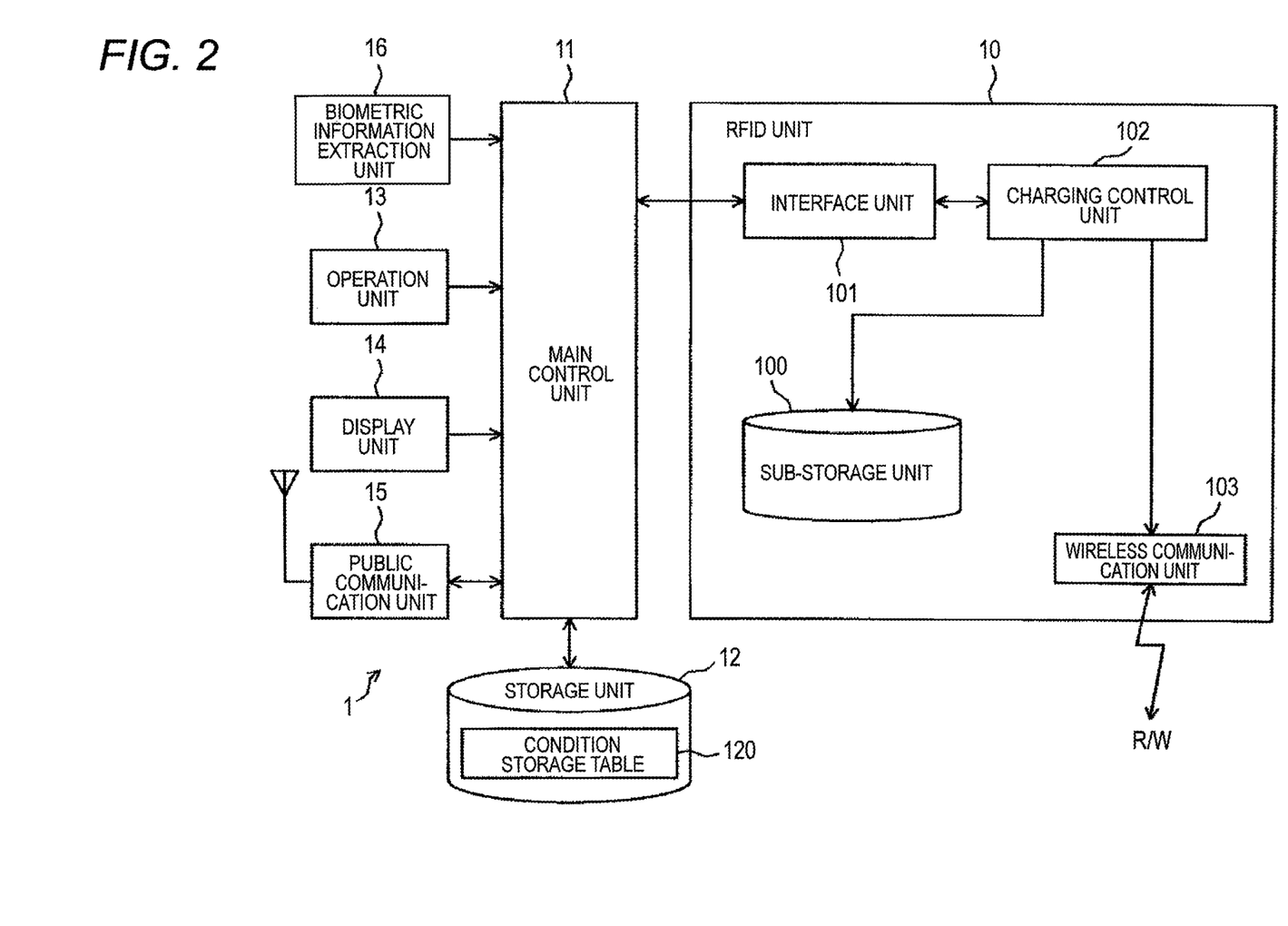
FIG. 2 is a block diagram showing an example of the internal configuration of the portable terminal device according to an embodiment of the present invention.

FIG. 2 is a block diagram showing an example of the internal configuration of the portable terminal device according to an embodiment of the present invention. Here, a mobile phone 1 is illustrated as the portable terminal device.

As shown in FIG. 2, the mobile phone 1 uses a main control unit 11 as a control center, and includes an RFID unit 10, a storage unit 12, an operation unit 13, a display unit 14, a public communication unit 15, and a biometric information extraction unit 16.

The main control unit 11 entirely controls the overall operation of the mobile phone 1.

That is, the main control unit 11 controls operations of the blocks (the transmission/reception of a signal in the communication unit 15, and the display of an image in the display unit 14, and a fingerprint extraction process in the biometric information extraction unit 16) so that various processes of the mobile phone 1 (audio communication via a circuit switched network, the creation and transmission/reception of an electronic mail, the reading of a Web (World Wide Web) site of the Internet, and the like) are executed in an appropriate procedure in response to an operation of the operation unit 13.

The main control unit 11 has a computer (microprocessor) to execute a process on the basis of a program (an operating system, an application program, or the like) stored in the storage unit 12. The above-described process is executed according to a procedure instructed in the program.

That is, the main control unit 11 executes a process by sequentially reading command codes from the program of the operating system or the application program stored in the storage unit 12.

Further, the main control unit 11 functions as a biometric authentication unit. For example, the main control unit 11 extracts user fingerprint information by the biometric information extraction unit 16 to be described later, compares the user fingerprint information with registered biometric information stored in a predetermined area of the storage unit 12, and outputs an authentication rate as a fingerprint authentication result.

The fingerprint authentication process reads several characteristic points from the extracted fingerprint, determines how many points of the characteristic points match registered characteristic points, and calculates an authentication rate by comparing with a predefined recognition rate. In terms of the characteristic points, an angle or direction of the most bent portion of fingerprint lines, the number of lines within a specific area, and the like is an analysis target.

Figure 3:
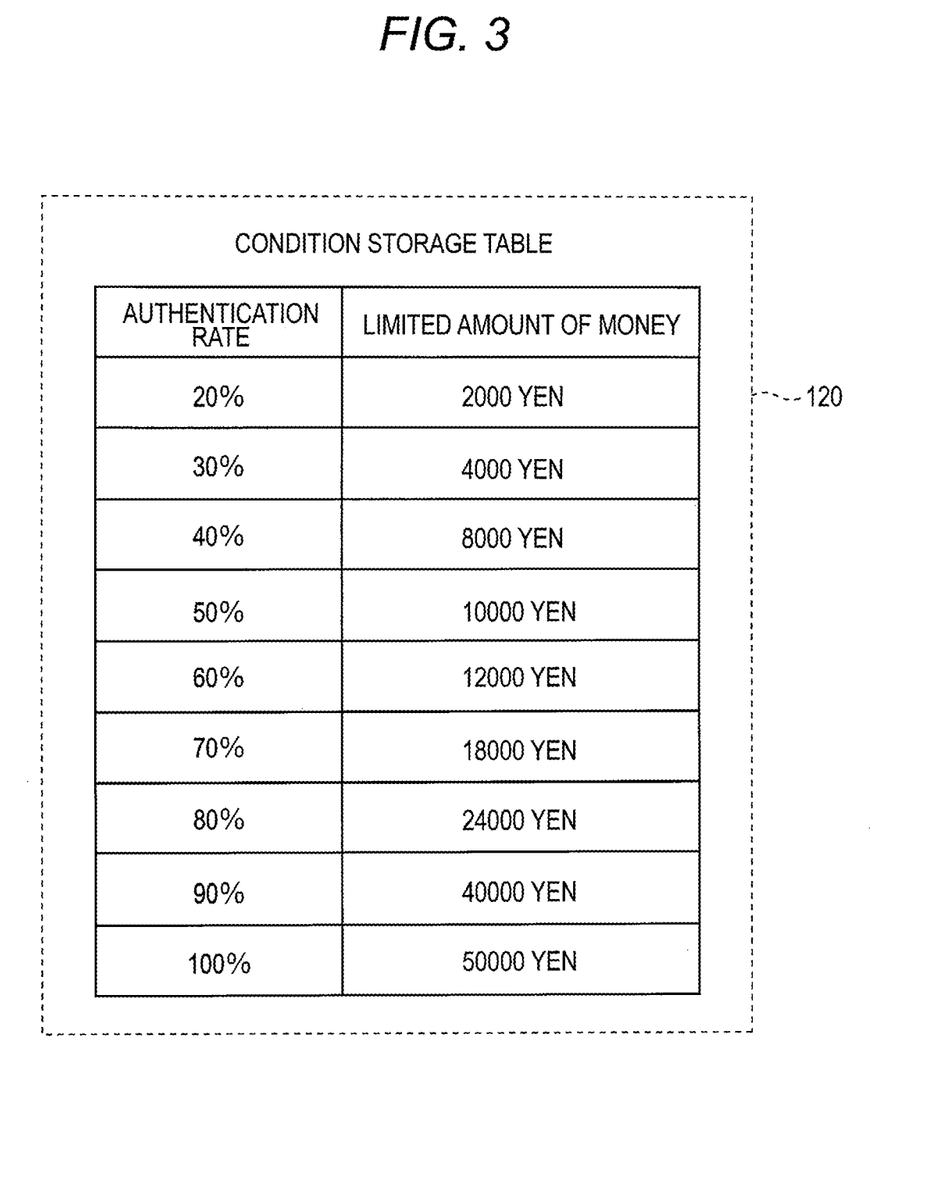
FIG. 3 is a diagram showing an example of a data structure of a condition storage table provided in the portable terminal device according to an embodiment of the present invention.

When an upper limit of a payable amount for each authentication rate or a payable charging category for each authentication rate is designated by the operation unit 13, the main control unit 11 causes a condition storage table 120 allocated to a predetermined area of the storage unit 12 to store the content thereof. An example of a data structure of the condition storage table 120 is shown in FIG. 3. Details thereof will be described later.

The storage unit 12 stores various data to be used for various processes of the mobile phone 1.

For example, the storage unit 12 stores a program of a computer to be executed by the main control unit 11, an address book for managing personal information such as a phone number of a communication partner or an electronic mail address, an audio file for reproducing a ring tone or an alarm tone, an image file for the standby screen, various setting data, temporary data for use in processing a program, and registered biometric information (fingerprints) and the like for use in a comparison with the fingerprint extracted by the biometric information extraction unit 16.

In the storage unit 12, a condition storage area (the condition storage table 120) in which the upper limit of the payable amount or the charging category for each authentication rate is set and registered is further allocated and stored. An example of the data structure of the condition storage table 120 is shown in FIG. 3. In the example shown in FIG. 3, the upper limit of the payable amount is defined.

For example, the storage unit 12 is configured by a nonvolatile storage device (a nonvolatile semiconductor memory, a hard disc device, an optical disc device, or the like) or a randomly accessible storage device (for example, SRAM or DRAM).

For example, the operation unit 13 has keys capable of assigning various functions such as a power key, a call key, numeric keys, character keys, direction keys, an enter key, a send key, and the like. When the keys are operated by an operator, the operation unit 13 generates a signal corresponding to operation content and outputs the generated signal as an instruction of the operator to the main control unit 11.

For example, the display unit 14 is configured by an LCD (Liquid Crystal Display Device) or an organic EL display (OLED (Organic Light Emitted Diode)), which displays an image according to a video signal supplied from the main control unit 11.

For example, the display unit 14 performs display based on a running application program, for example, displays a phone number of a transmission destination upon wireless transmission by the communication unit 15, a phone number of a transmission source upon reception, content of a reception mail or a transmission mail, a date, a time, a remaining battery level, transmission success and failure, a standby screen, and the like.

Also, under control of the main control unit 11, the display unit 14 displays a message when payment is impossible.

The public communication unit 15 captures a wireless communication system, wirelessly communicates with a base station (not shown) connected to a communication network, and transmits/receives various data. The various data is audio data at the time of audio communication, mail data at the time of mail transmission/reception, web page data at the time of web browsing, data of electronic money received from a charge terminal (not shown), and the like.

The public communication unit 15 captures a plurality of communication systems, and, for example, performs wireless communication with the communication server 2 of a carrier according to a communication protocol such as CDMA2000 1x (hereinafter, referred to as 1x), EVDO, or a wireless LAN. A money receiving process or a transmission/reception process for charging information is executed with the electronic money management device 4 connected via the communication server and the communication network such as a WAN.

Here, the biometric information extraction unit 16 uses a sweep-type fingerprint sensor which reads a fingerprint by tracing a sensor surface with a finger.

The fingerprint comparison is performed by the main control unit 11. The main control unit 11 reads several characteristic points from the fingerprint extracted in the biometric information extraction unit 16, determines how many points of the characteristic points match characteristic points (registered biometric information) registered to the storage unit 12, and calculates an authentication rate by comparing with a predefined recognition rate.

The RFID unit 10 includes a sub-storage unit 100, an interface unit 101, and a sub-control unit 102, and a wireless communication unit 103. The wireless communication unit 103 also includes a loop antenna. The RFID unit 10 is one of the magnetic field communication means partially using induced electromotive force by using an electromagnetic wave of, for example, 13.65 MHz, with a reader/writer device (not shown).

The sub-storage unit 100 stores electronic money information increased/decreased by charging information (payment permission request information) received from a reader/writer (R/W) such as a POS terminal (not shown) installed in a shop or the like via the wireless communication unit 103. The interface unit 101 serves as an interface in a data communication path between the main control unit 11 and the RFID unit 10 (the sub-control unit 102).

The sub-control unit 102 has a built-in CPU, and has a function of executing a charging process to the sub-storage unit 100 on the basis of charging information (payment permission request information) received by the wireless communication unit 103 to be described later.

Specifically, the sub-control unit 102 specifies the upper limit of the payable amount or the charging category on the basis of the authentication rate calculated as a result of biometric authentication by the main control unit 11. On the basis of charging information (payment permission request information) acquired by the wireless communication unit 103, a determination is made as to whether or not the charging is within the upper limit of the payable amount or whether or not the charging is in the payable charging category. When the charging is greater than the upper limit of the payable amount or does not match the payable charging category, charging disapproval information is output from the wireless communication unit 103.

When the result of biometric authentication by the main control unit 11 is equal to or greater than a minimum authentication rate, the sub-control unit 102 is activated. The sub-control unit 102 has a function of specifying the upper limit of the payable amount or the charging category on the basis of an authentication rate when the sub-control unit 102 is activated.

When the sub-control unit 102 executes a payment process on the basis of the charging information (payment permission request information) received by the wireless communication unit 103, the main control unit reads the upper limit of the payable amount or the charging category corresponding to the authentication rate of biometric authentication from the condition storage table 120 stored in the storage unit 12.

At the time of executing the payment process on the basis of the charging information (payment permission request information) received by the wireless communication unit 103, the sub-control unit 102 determines whether or not the charging is in the upper limit range of the payable amount or matches the charging category. When the charging is greater than the upper limit of an amount of money or does not match the charging category, the sub-control unit 102 is configured to request the main control unit 11 to display payment disapproval on the display unit 14.

The wireless communication unit 103 which is an example of a request acquisition unit, is activated at the time of detecting power from the reader/writer (R/W) such as a POS terminal (not shown) or the like installed in a shop or the like, and performs wireless communication between the mobile phone 1 and a reader/writer such as a POS terminal or the like.

In a state in which communication by the RFID unit 10 is possible (lock is released), the sub-storage unit 100, the interface unit 101, and the sub-control unit 102 perform an operation of receiving the power supplied by a battery (not shown) built in the mobile phone 1.

Figure 4:
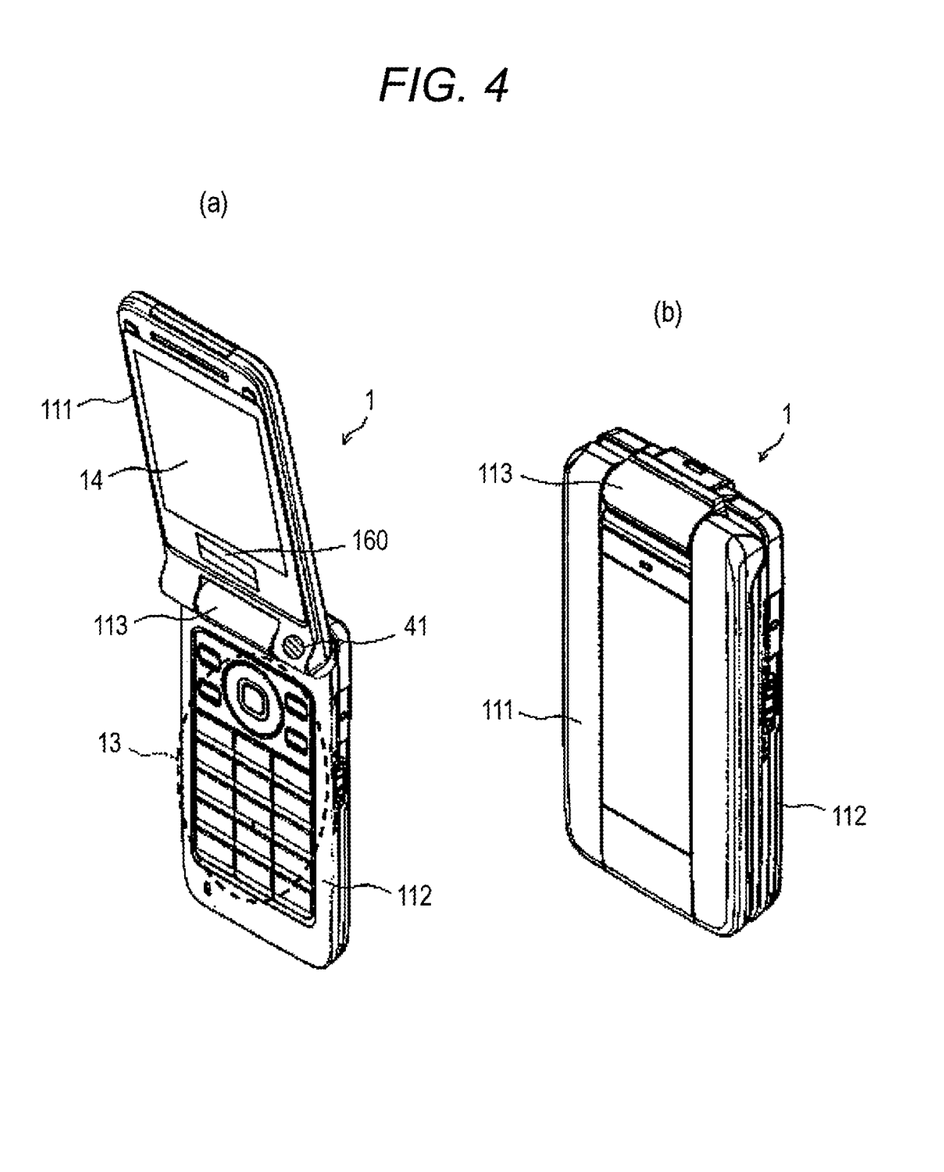
FIG. 4 is a diagram showing an example of the external structure of the portable terminal structure according to an embodiment of the present invention.

FIG. 4 is a diagram showing an example of the external structure of a portable terminal device (here, the mobile phone 1) according to an embodiment of the present invention.

As shown in FIG. 4, a folding type mobile phone is assumed as the mobile phone 1. As shown in FIG. 4, the mobile phone 1 has an upper casing 111, a lower casing 112, and a hinge unit 113.

FIG. 4(a) is a diagram showing a state (open state) in which the mobile phone 1 is open, and FIG. 4(b) is a diagram showing a state (closed state) in which the mobile phone 1 is folded.

As shown in FIG. 4(a), the display unit 14 is provided on one surface of the upper casing 111 which is not externally exposed in the closed state of the mobile phone 1 shown in FIG. 4(b). As shown in FIG. 4(a), a sweep-type fingerprint sensor 160 as the biometric information extraction unit 16 is embedded outside a screen active area of the display unit 14. A fingerprint is extracted by sweeping a finger over the fingerprint sensor 160, and is received by the main control unit 11. The fingerprint sensor 160 may be installed in a position externally exposed in the closed state.

As shown in FIG. 4(a), the operation unit 13 is disposed on one surface of the lower casing 112 which is not externally exposed in the closed state of the mobile phone 1 shown in FIG. 4(b).

The hinge unit 113 is a hinge mechanism having a rotary shaft capable of opening/closing the upper casing 111 and the lower casing 112 and taking the transition for the open state of the mobile phone 1 shown in FIG. 4(a) and the closed state shown in FIG. 4(b).

The open state/closed state of the mobile phone 1 is monitored by the main control unit 11. The main control unit 11 is able to detect the closed state of the mobile phone 1. Specifically, for example, the main control unit 11 detects the closed state by monitoring whether or not a detection switch (not shown) of the lower casing 112 is pushed by a projection portion (not shown) disposed on the upper casing 111 (that is, the state is determined as the closed state when the detection switch is pushed, and otherwise, the state is determined as the open state). The opening/closing detection is not limited to the switch, and may be performed by various sensors.

It is noted that, for example, a camera 41 which photographs a face of the user may be used as the biometric information extraction unit 16. In this case, characteristic elements of the face are determined by the main control unit 11. Hereinafter, description will be given using an example of a fingerprint sensor.

Figure 5:
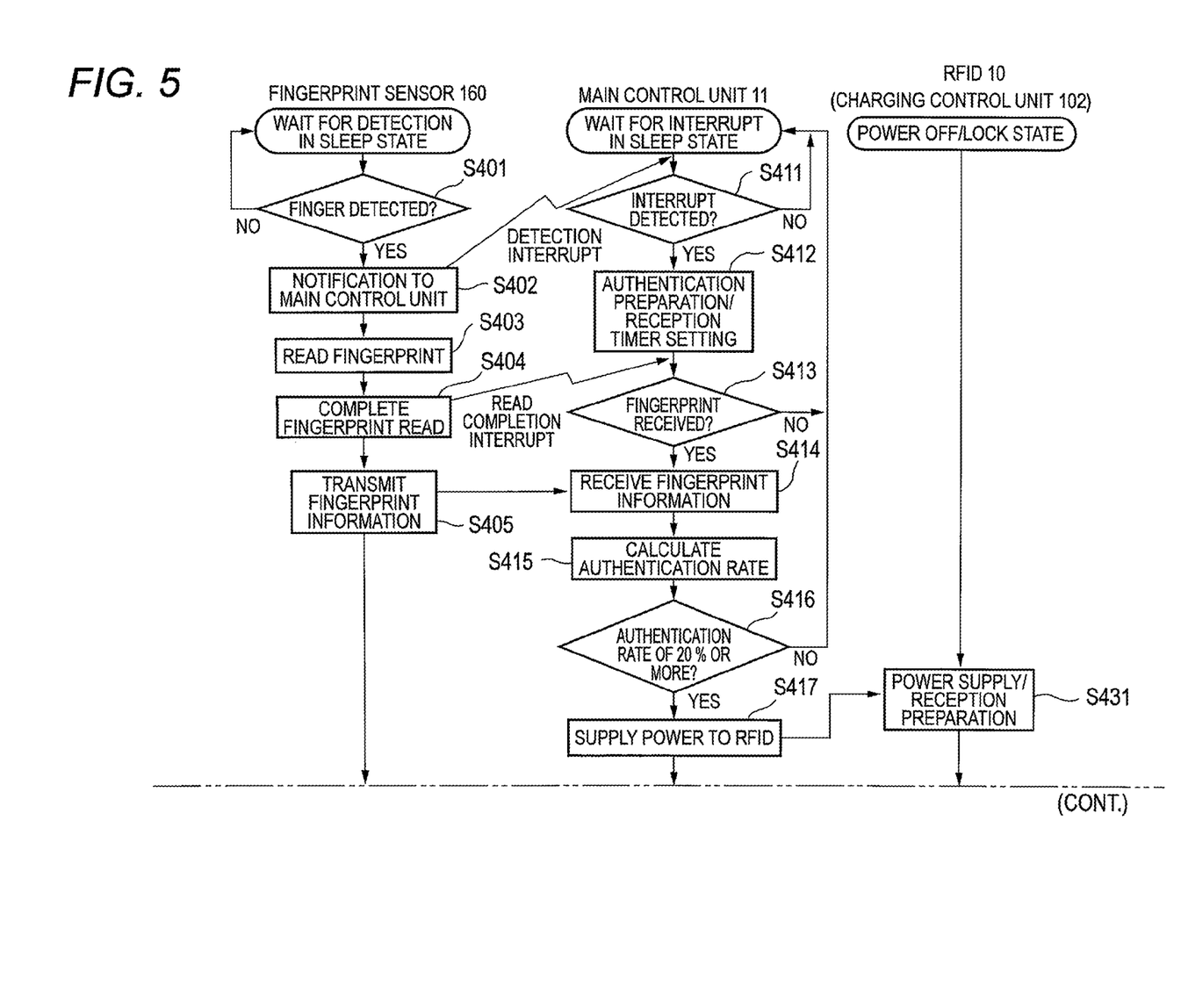
FIG. 5 is a flowchart showing a payment processing operation of the portable terminal device according to an embodiment of the present invention.
Figure 6:
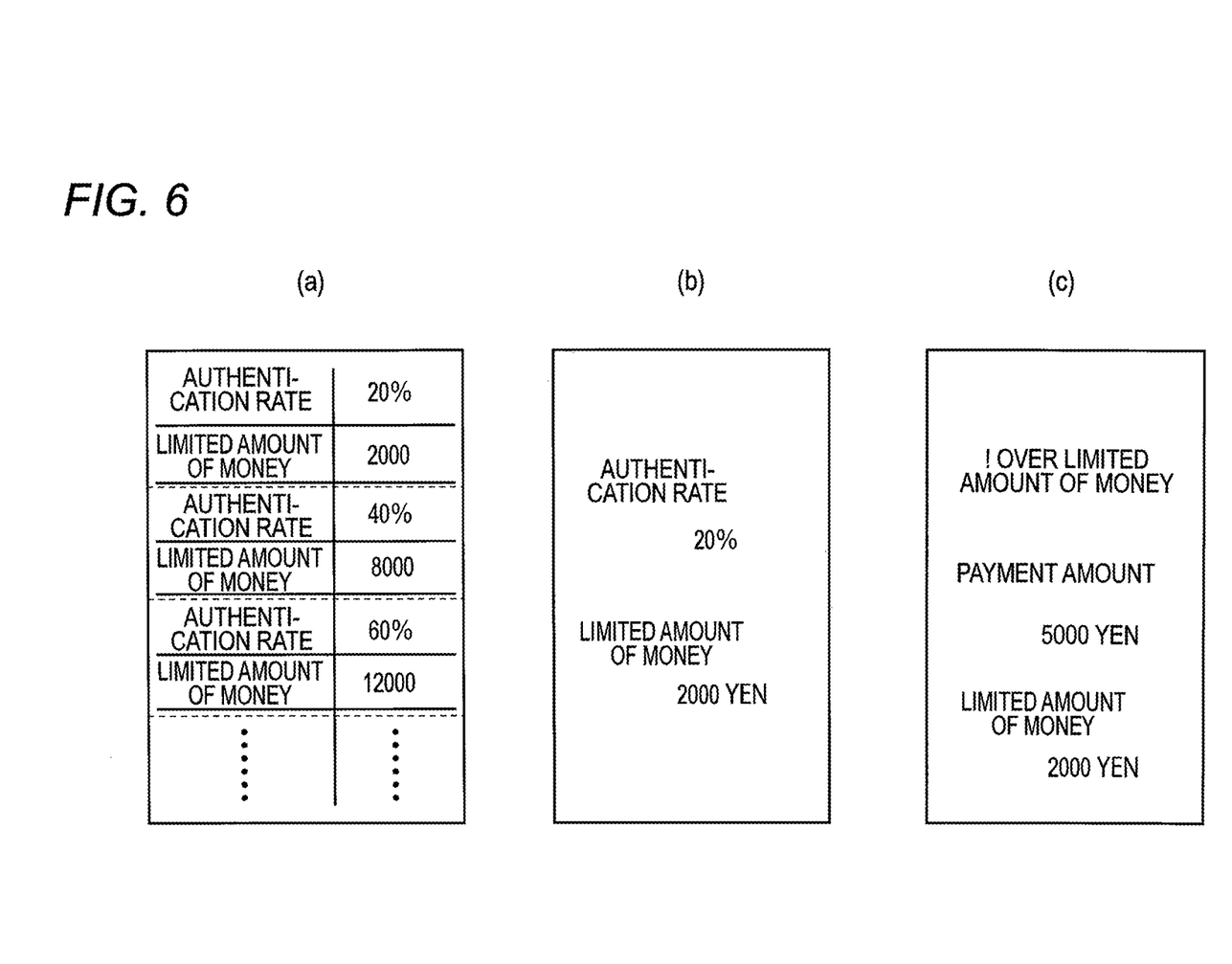
FIG. 6 is a diagram showing an example of a screen configuration provided in the portable terminal device according to an embodiment of the present invention.

FIG. 5 is a flowchart showing a payment processing operation of the portable terminal device according to an embodiment of the present invention. Here, the operation flow in each of the fingerprint sensor 160, the main control unit 11 and the sub control unit 102 and the relationship thereof are shown. FIG. 6 is a diagram showing an example of a screen configuration displayed on the display unit 14 by the portable terminal device according to an embodiment of the present invention.

First, in a state in which a power supply of the mobile phone 1 is activated, the user sets an authentication level of biometric authentication. That is, when a setting request is generated by the operation unit 13, the main control unit 11 displays a screen for setting a permission level for each authentication level as shown in FIG. 6(a). In this example, by the user's operation, a permissible payment amount is set to 2000 yen at an authentication rate of 20%, a permissible payment amount is set to 8000 yen at an authentication rate of 40%, and a permissible payment amount is set to 12000 yen at an authentication rate of 60%. In terms of this setting, the basic principle is that a payment process for a small amount of money is possible even though the authentication rate is low, and a high authentication rate is necessary for a payment for a large amount of money. When the completion of the association of the money amounts and the authentication rates is instructed by the operation unit 13, the main control unit 11 updates the condition storage table 120 shown in FIG. 3 on the basis of a correspondence relationship of an authentication rate with a designated amount of money. Each value of the condition storage table may be preset to a default value from the time of factory shipment without setting by the user.

In relation to an authentication level setting request, at least the authentication for a valid user is necessary. When the setting request is generated by the operation unit 13, the main control unit 11 makes a prompt to perform a password input or additional fingerprint authentication. It is advantageous to display an authentication level setting screen only when the authentication has succeeded. Here, the previous setting is maintained in unsuccessful case.

Hereinafter, a payment processing operation of a portable terminal device according to an embodiment of the present invention will be described with reference to the flowchart shown in FIG. 5 and the screen configuration example shown in FIG. 6.

First, a sensing operation of the fingerprint sensor 160 as the biometric information extraction unit 16 is started by the user performing a specific operation by the operation unit 13 so as to activate a payment process. The user sweeps a specific finger over the fingerprint sensor 160 (step S401 "Yes"), and an interrupt is issued to the main control unit 11 (step S402). The payment process described as follows is started.

In the example of FIG. 5, the main control unit 11 waits for an interrupt to be received in a sleep state in the payment process of electronic money.

The main control unit 11 which has detected the interrupt (step S411 "Yes") first sets a reception timer so as to execute the fingerprint authentication (step S412). The fingerprint sensor 160 reads a fingerprint (step S403), the main control unit 11 is notified of fingerprint read completion (step S404), so that the main control 11 can recognize the reception of the fingerprint (step S413 "Yes"). When a read completion interrupt has not been received until the timer measures a predetermined time (step S413 "No"), the main control unit 11 proceeds to the state of waiting for an interrupt in sleep mode.

After reading the fingerprint of the user, the fingerprint sensor 160 transmits the read fingerprint information to the main control unit 11 (step S405). The main control unit 11 which has received the fingerprint information (step S414) calculates an authentication rate by executing the fingerprint authentication process (step S415).

In this example, it is determined whether or not the calculated authentication rate exceeds 20% set as the minimum authentication rate (step S416).

As described above, the upper limit of the payable amount (the limited amount of money) set in correspondence with the authentication rate is stored in advance in the condition storage table 120 by the user's setting.

When the authentication rate is determined to be 20% or more in the above-described step S416 (step S416 "Yes"), the main control unit 11 supplies the power to the RFID unit 10 (step S417).

The main control unit 11 further acquires data regarding a limited amount of money corresponding to the authentication rate from the condition storage table 120 by referring to the storage unit 12 (step S418), and sets the limited amount of money in the main control unit 11 and to the RFID unit 10 and displays the limited amount of money along with the authentication rate on the screen (step S419).

At this time, the screen display example is shown in FIG. 6(*b*). The main control unit 11 releases a lock and is set to a state in which communication with the RFID unit 10 is possible (step S420). At the time of determining that the authentication rate is less than 20% (step S416 "No"), the main control unit 11 proceeds to the state of waiting for an interrupt in sleep mode.

It is assumed that the RFID unit 10 is basically in the lock state in which the power supply is turned off. The sub-control unit 102 starts to be operated using the power supply by the main control unit 11 as a trigger (step S431), sets the limited amount of money reported by the main control unit 11 (step S432), and releases the lock by receiving a lock release notification from the main control unit 11 (step S433).

The user can know that the payment preparation has been completed to permit the payment process within the limited amount of money by checking the screen shown in FIG. 6(*b*).

Thereafter, the user holds the wireless communication unit 103 of the portable terminal device close to a magnetic field transmission unit of the reader/writer (R/W) such as a POS (not shown).

Next, when a magnetic field is detected from the reader/writer device, the RFID unit 10 executes the payment process using the detected magnetic field as a trigger (step S434). In step S434, the sub-control unit 102 acquires a charging amount associated with a product purchase from the reader/writer device via the wireless communication unit 103 by magnetic field communication, and compares the above-described amount with a limited amount of money previously set from the main control unit 11. When the charging amount does not exceed the set limited amount of money, the payment process is permitted, the charging amount is subtracted in the charging storage unit, and also the completion of a subtraction process for an amount of money is reported from the wireless communication unit 103 to the reader/writer device. The reader/writer device determines that the payment process has been successfully completed by receiving the process completion notification, and displays the payment completion on its display device or the like (step S435).

At the time of determining that the charging is greater than the upper limit of the payable amount in step S434, charging disapproval information is transmitted from the wireless communication unit 103 and is displayed on the display device of the reader/writer (R/W) such as a POS, and also the same result is reported to the main control unit 11 (step S435).

After releasing the lock (step S420), the main control unit 11 is in a state of waiting for a payment process from the sub-control unit 102 (step S421). The main control unit 11 displays the payment result received from the sub-control unit 102 on the screen of the display unit 14.

When a payment disapproval notification is received, a message indicating that the payment is impossible is displayed on the display unit 14 (step S422).

At the time of determining that the charging is greater than the upper limit of the payable amount, an example of a screen configuration displayed on the display unit 14 is shown in FIG. 6(*c*).

Subsequently, the main control unit 11 turns off the power to be supplied to the RFID unit 10, locks the RFID unit 10 (step S423), and sets the fingerprint sensor 160 to the sleep state (step S424). Upon receipt thereof, the fingerprint sensor 160 proceeds to the state of waiting for detection in sleep mode by executing the sleep process (step S406).

According to the portable terminal device related to the embodiment of the present invention as described above, it is possible to set a limited amount of money or a charging category corresponding to an authentication rate, and security control by the intention of the user is possible since condition setting registration to the condition storage table 120 is performed by the user operating the operation unit 13.

The payment is possible within a limited amount of money set by the user even when the authentication rate is low. Thus, it may be smoothly used at the time of paying a relatively small amount of money in a station ticket gate or the like, and therefore it is possible to use electronic money without sacrificing convenience.

Figure 7:
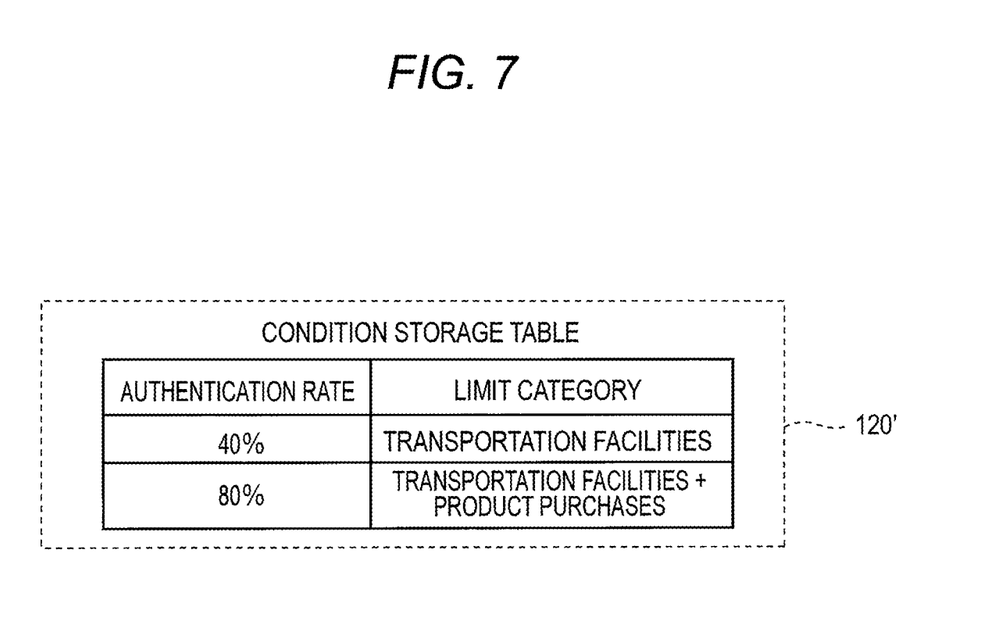
FIG. 7 is a diagram showing another example of a data structure of a condition storage table provided in the portable terminal device according to an embodiment of the present invention.

According to the portable terminal device related to the embodiment of the present invention described above, the upper limit of a payable amount for each authentication rate defined in the stored condition storage table 120 allocated to a predetermined area of the storage unit 12 is described, but it is possible to achieve the same effect if a payable charging category is defined for each authentication rate. FIG. 7 shows an example of a condition storage table 120' when a payable charging category is defined for each authentication rate. At present, electronic money using RFID communication is used in convenience stores, transportation facilities, cinemas, and the like. Here, charging information from the reader/writer includes additional charging information (charging category information) regarding a business form/type, or charging at the time of purchasing a service at the entrance/exit of ticket gates in transportation facilities, charging at the time of purchasing products in shops, or the like.

When a payable charging category is defined for each authentication rate as shown in FIG. 7, the sub-control unit 102 specifies the payable charging category on the basis of an authentication rate by referring to the condition storage table 120'. At the time of a payment process, the corresponding charging category information is extracted from charging information (payment permission request information) acquired by the wireless communication unit 103 and it is determined whether or not the charging is in a payable charging category. When the charging does not match the payable charging category, charging disapproval information is transmitted from the wireless communication unit 103.

Thereby, it is possible to use a method of permitting the passage of ticket gates of public transportation facilities even if the authentication rate is low, but limiting a product purchase. For example, in the example shown in FIG. 7, the use in transportation facilities is permitted, but the product purchase is limited, at an authentication rate of 40%. For example, the product purchase as well as the use in transportation facilities is permitted at an authentication rate of 80%.

An example in which electronic money is input (charged) in advance according to the mobile phone related to the above-described embodiment of the present invention is described, but a credit method or the like for post payment is also applicable as the charging category.

Only the mobile phone 1 having the built-in RFID unit 10 as a portable terminal device has been illustrated, but the same control operation may be performed by integrating an RFID card to which monetary value data is recorded and software in which monetary value data is managed into a PC or the like. The present invention is not limited to the mobile phone 1, and, for example, is also applicable to a PDA (Personal Digital Assistants), electronic organizers, gaming machines, notebook PCs, and the like having the same configuration.

According to the portable terminal device related to the above-described embodiment of the present invention, a limited amount of money corresponding to an authentication rate is stored in advance in the condition storage table 120, but the condition storage table 120 may not be provided. In this case, the limited amount of money is calculated on the basis of the authentication rate. For example, it is possible to calculate the limited amount of money by multiplying a predetermined value (for example, 10000 yen) by the authentication rate.

As another embodiment, a target which is limited in stepwise manner by the authentication rate may be one other than the charging.

For example, the reader/writer is installed in advance at an entrance of a building of a company or the like and an entrance of each room, and it is possible to unlock the entrance door only when authentication by the RFID unit 10 succeeds.

In the case of entering such facilities, a security level of a room where important documents are kept may be set to be high, and a minimum security level may be set for the entrance of a building as long as only the minimum security level is guaranteed. Even in this case, the present invention is applicable.

Specifically, first, it makes it possible for the reader/writer installed at each door to transmit type information of the door by using a magnetic field as a carrier. In the portable terminal device, an available door for each authentication level is preset, and is registered to the condition storage table 120. Thereafter, the portable terminal device extracts in advance biometric information such as a fingerprint by the biometric information extraction unit before the RFID unit 10 is held over the reader/writer for each door, and determines an authentication level by the main control unit 11. Of course, at this time, the door is not unlocked since the RFID unit 10 does not release the lock when even the minimum authentication level may not be cleared. When the minimum level can be cleared, a level authenticated by the condition storage table 120 is recognized. A level range in which the door may be unlocked is set to the main control unit 11 and the sub storage unit 102. When the RFID unit 10 is held over the reader/writer, the wireless communication unit 103 detects a magnetic field and the sub-control unit 102 recognizes a communication start and acquires the door type information transmitted from the reader/writer. The sub-control unit 102 compares the acquired door type with a level at which the door may be unlocked set from the main control unit 11, and transmits an open instruction to the reader/writer via the wireless communication unit 103 at the level at which opening is possible. The reader/writer which has received the open instruction opens a corresponding door. In contrast, when the acquired door type is not at the level at which opening is possible, opening disapproval is transmitted and the reader/writer reports the opening disapproval and does not perform opening.

By the above-described configuration, the present invention may set a minimum entrance limit while guaranteeing convenience as much as possible, and may regulate security at a high level for the entrance to an important room.

The case of handling a fingerprint as biometric authentication according to the embodiment of the present invention is described, but face authentication may be also usable.

In this case, it is necessary to mount a camera for face authentication constituted by a photoelectric conversion element such as a CCD (Charge Coupled Device) or CMOS (Complementary Metal Oxide Semiconductor) image sensor on the mobile phone 1. For example, the camera is installed in the casing in a state in which an optical axis is set in a direction to the face of the operator (for example, a position indicated by reference numeral 41 in FIG. 4(a)) in a state of operating the casing (that is, a posture of the operator taking the casing by hand and directing the eye to the display unit 14) in FIGS. 4(a) and 4(b).

Iris, retina, or vein authentication is possible instead of fingerprint or face authentication, and voice authentication is possible instead of face authentication.

In the above, the term, an authentication rate of biometric authentication, is used. However, any term may be used as long as indicating an extent of matching of characteristic elements of input biometric information and pre-registered biometric information. That is, the present invention is not limited to a percent calculation in which 100% is set only when all characteristic elements match and a percent is calculated based on the number of matching elements. For example, a determination may be made only by the number of matching characteristic elements, and an extent of the number of matching elements for all characteristic elements may be used as the authentication rate.

A charging request received by the RFID unit 10 as permission request information is illustrated and described according to the embodiment of the present invention, but others may be applicable. For example, the permission request information may be a communication permission request received by infrared communication with other devices using an infrared communication unit (not shown) or a communication permission request returned at the time of accessing a server device or the like by the user's operation.

When a permission request is a communication permission request, counterpart devices which perform communication by an infrared communication unit or the public communication unit 15 are associated with information of write/read permission, a security level set according to the importance of information to be read, a fee amount necessary for acquiring information, and the like, and are associated in advance with biometric authentication rates divided into a plurality of levels in stepwise manner, and all of which are stored in the condition storage table 120 within the storage unit 12.

Thereafter, at the time of acquiring information including a communication permission request as permission request information, the main control unit 11 specifies a type of information necessary for permission included in the acquired communication permission request, and next refers to the conditional permission table 120 corresponding to the specified information type. It is determined which level the biometric authentication rate acquired by the above-described method matches in the condition storage table 120, and it is determined whether or not a corresponding communication type is permissible. At the time of determining that it is within a permissible level, the main control unit 11 responds the communication permission to a counterpart device, and enables the user's input to be received for the communication start. On the other hand, in the case of an impermissible level, a prompt to re-input biometric information is displayed without responding the communication permission to the counterpart device, or unauthorized access for the counterpart device is inhibited by disconnecting communication with the counterpart device by displaying a notification of "communication disapproval". In this case, the request acquisition unit becomes the public communication unit 15 or the infrared communication unit (not shown), and a permissible range is specified by the main control unit 11 as described above.

An access input itself by the user's operation for an access-limited function in the portable terminal device which is not associated with communication may be permission request information in addition to a permission request associated with the communication. When the permission request is the access input itself, an access permission level is preset for each function and biometric authentication rates divided into levels in stepwise manner are associated and stored in the condition storage table 120 within the storage unit 12.

When the user's input to the operation unit 13 is generated, the main control unit 11 identifies a function to be accessed by the operation thereof. As an example of an access restriction function, a key lock release function of invalidating the input of the key operation itself, an address book read function, a data read function for internally accumulated photo data, a communication function directed to the outside, and the like are included. In the case of the user's input for a function in which access restriction is set, the main control unit 11 specifies an access permission level set for a corresponding function by referring to the conditional permission table 120. Next, it is determined which level a biometric authentication rate acquired by the above-described method matches in the condition storage table 120, and it is determined whether or not the biometric authentication rate satisfies a specified access permission level. At the time of determining that it is within a permissible level, the main control unit 11 executes a function for which access has been requested, and displays a corresponding screen on the display unit 14. On the other hand, at the impermissible level, a prompt to re-input biometric information is displayed without executing the requested function, or unauthorized access directed to the restricted function is inhibited by displaying a notification of "access disapproval" and turning off the power supply. In this case, the request acquisition unit becomes the operation unit 13, and a permissible range is specified by the main control unit 11 as described above.

The examples shown above are only exemplary, and other types of limited processing may be various other types.

Biometric information may be input after and before permission request information is acquired. For example, when the biometric information is input before the permission request information is acquired, it is preferable to activate the biometric information extraction unit 16, immediately after the power supply of the portable terminal device is activated and set a state of receiving the input of biometric information, and also to display a prompt to input biometric information on the display unit 14. When the biometric information is input and the authentication rate is calculated, the calculated authentication rate may be retained until the power supply is turned off at the next time or until a state in which the user's operation is not generated for a while is reached, and may be used as a determination material every time the permission request is acquired.

All functions of configuration blocks provided in a portable terminal device according to the embodiment of the present invention shown in FIG. 2 may be implemented by software, or at least a part thereof may be implemented by hardware.

For example, data processing in the main control unit 11 and the sub-control unit 102 of the RFID unit 10 may be implemented on a computer by one or more programs, and at least a part may be implemented by hardware.

While the present invention has been described in detail with reference to specific embodiments thereof, it will be apparent to one skilled in the art that various changes and modifications can be made therein without departing from the spirit and scope thereof.

This application is based on Japanese Patent Application No. 2008-019975 filed on Jan. 30, 2008, the contents of which are hereby incorporated by reference.

The invention claimed is:

1. A portable terminal device comprising:
a battery;
a biometric sensor configured to acquire biometric information from a user;
a Radio Frequency Identification (RFID) unit which is configured to acquire information;
a condition storage unit which associates each of a plurality of authentication rates with an amount of money, such that a higher one of the plurality of authentication rates is associated with a higher amount of money than a lower one of the plurality of authentication rates; and
a control unit which is configured to
 receive the biometric information,
 calculate an authentication rate for the biometric information, and,
 when the calculated authentication rate is equal to or greater than a lowest one of the plurality of authentication rates, supply power from the battery to the RFID unit, and set a maximum amount of money for a transaction, which is to be conducted via the portable terminal device, to the amount of money associated with the calculated authentication rate in the condition storage unit.

2. The portable terminal device according to claim 1, wherein the RFID unit includes a communication unit which communicates with an external communication device to acquire the information.

3. The portable terminal device according to claim 1, wherein, when the calculated authentication rate is less than the lowest one of the plurality of authentication rates, the control unit requests a re-input of biometric information to the biometric sensor.

4. The portable terminal device according to claim 2, wherein the control unit includes:
  a main control unit which is configured to calculate the authentication rate; and
  a sub-control unit which is configured to control the communication unit.

5. The portable terminal device according to claim 2, wherein the communication unit performs magnetic field communication using an electromagnetic wave.

6. The portable terminal device according to claim 1, further comprising a charging storage unit which is configured to store electronic money information, wherein the information acquired by the RFID unit is charging request information regarding the electronic money information.

7. The portable terminal device according to claim 1, further comprising a display unit, wherein the control unit causes the display unit to display payment disapproval when the calculated authentication rate is less than the lowest one of the plurality of authentication rates.

8. The portable terminal device according to claim 1, wherein the RFID unit includes an operation unit which is configured to receive a user input to acquire the information.

9. A portable terminal device comprising:
  a battery;
  a biometric sensor configured to acquire biometric information from a user;
  a Radio Frequency Identification (RFID) unit which is configured to acquire charging request information for a transaction, which is to be conducted via the RFID unit, wherein the charging request information comprises a category of charge for the transaction;
  a condition storage unit which associates each of a plurality of authentication rates with one or more categories of charges; and
  a control unit which is configured to
    receive the biometric information,
    calculate an authentication rate for the biometric information, and,
    when the calculated authentication rate is equal to or greater than a lowest one of the plurality of authentication rates, supply power from the battery to the RFID unit, receive charging request information for a transaction via the RFID unit, and only conduct the transaction if the received charging request information comprises a category of charge that corresponds to the one or more categories of charges associated, in the condition storage unit, with the calculated authentication rate or a lower one of the plurality of authentication rates.

10. A method of controlling a portable terminal device having a memory, a battery, a biometric sensor configured to acquire biometric information from a user, and a Radio Frequency Identification (RFID) unit, the method comprising:
  storing, in the memory, each of a plurality of authentication rates in association with an amount of money, such that a higher one of the plurality of authentication rates is associated with a higher amount of money than a lower one of the plurality of authentication rates;
  calculating an authentication rate based on biometric information received by the biometric information input unit; and
  when the calculated authentication rate is equal to or greater than a lowest one of the plurality of authentication rates, supplying power from the battery to the RFID unit to acquire information via the RFID unit for a transaction to be conducted via the portable terminal device, and setting a maximum amount of money for the transaction to the amount of money associated with the calculated authentication rate.

* * * * *